Oct. 4, 1966  J. W. JOHANSSON  3,276,490

PORTABLE CUTTING DEVICE

Filed March 5, 1964

INVENTOR

JOSEF W. JOHANSSON

BY *Larson and Taylor*

ATTORNEYS

# United States Patent Office 3,276,490
Patented Oct. 4, 1966

3,276,490
PORTABLE CUTTING DEVICE
Josef William Johansson, Upplands Vasby, Sweden
Filed Mar. 5, 1964, Ser. No. 349,668
5 Claims. (Cl. 143—32)

This invention relates to a length measuring means for use with a portable cutting device and more particularly to a motor hand saw that is used for cutting timber.

In preparing wood for the paper pulp industry as well as other log using industries, felled timber is cut into logs of pre-determined length. The most common device used in cutting the felled timber is a gasoline powered portable chain saw.

A given industry will generally require logs of a specific size as such logs will be adaptable to automatic handling etc. It might be appropriate to state here that the requirements of a given industry are quite analagous to the requirements of the homeowner for fireplace logs. It is quite apparent that oversize or undersize logs are not suitable. In the timber industry, where, for example a log four-meters long is desired, a typical practice is to employ a four-meter rod. Such a rod is obviously awkward to carry about. It has also been suggested to use a foldable rule with a portable saw, but operation with such a rule is time consuming.

It is an object of the present invention to provide a tool with means to locate the tool at a pre-determined distance from the end of a work piece.

It is a further object of the present invention to provide a portable gasoline operated chain saw having means for efficiently measuring out a predetermined distance on a log such that the log can be repeatedly measured and cut by a single operator without interfering with a normal cutting operation.

It is a further object of the present invention to provide a length measuring means which, in combination with a tool, provides a device which achieves the foregoing objects.

These and other objects are achieved according to the present invention by providing a tool with a tape measure adapted to hook to the end of a work piece for measuring out a predetermined distance, and to release therefrom after the distance has been measured.

A specific embodiment of the invention is shown in the drawings wherein like numerals refer to like parts and wherein.

Figure 1:
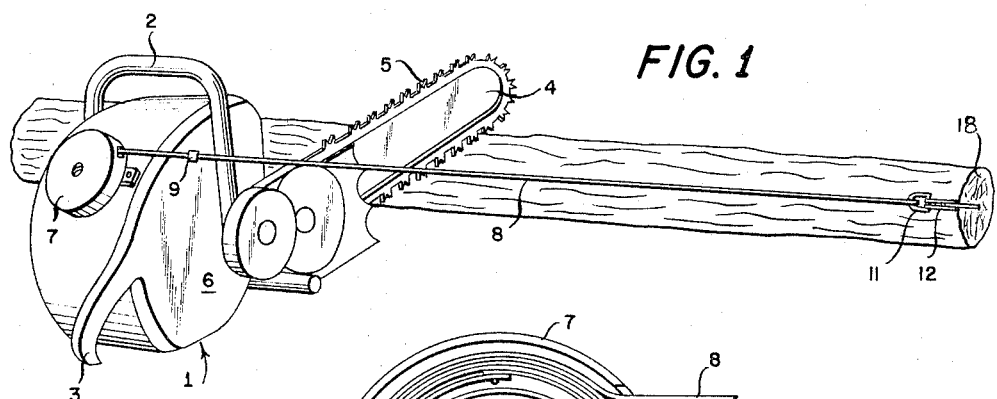
FIG. 1 is a perspective view of a motor hand saw with length measuring means according to the invention.
Figure 2:
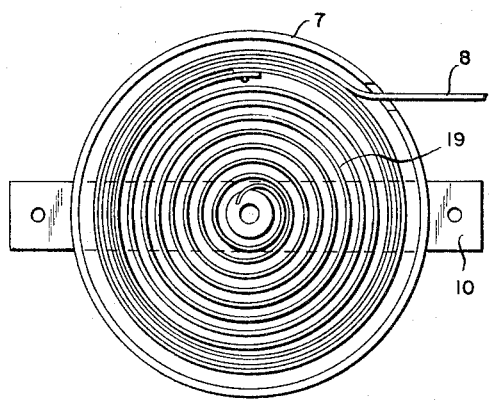
FIG. 2 is a view showing the measuring means, on an enlarged scale.

The motor hand saw according to FIG. 1 contains a casing-like framework 1 carrying handles 2 and 3 and a projecting flat sword member 4 forming a guide for an endless chain saw 5 consisting of links with saw teeth and driven by a combustion motor 6 arranged in the framework 1. On framework 1 there is removably attached a measuring means housing or container 7 into which a flexible measuring member 8, for instance of stainless steel or nylon, is coiled. The member 8 has an indicator 9 for instance a knot or other mark that can be read off against the longitudinal distance between the chain saw and an end of a log or other work piece. Casing 7 contains a spring device 19 that biases measuring member 8 into coiled position in casing 7. Casing 7 is removably attached to the framework 1 in that the casing on its under side is provided with a tongue 10, that is attachable in a slot or groove in the framework 1.

Figure 3:
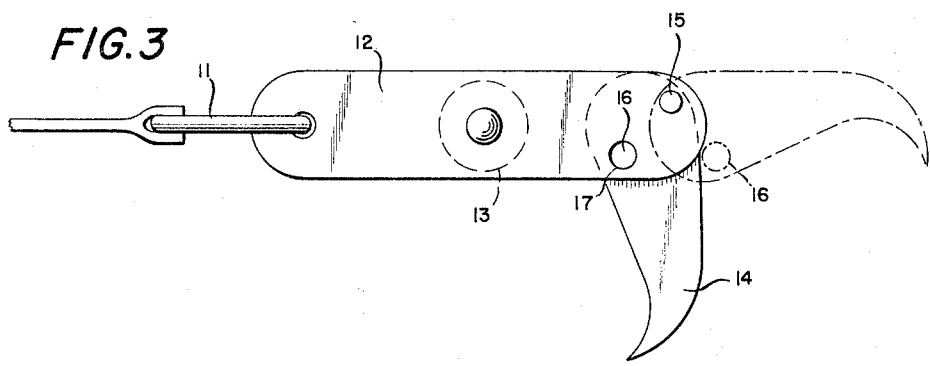
FIGS. 3 and 4 are two different views on an enlarged scale of a hook member according to the invention.
Figure 4:
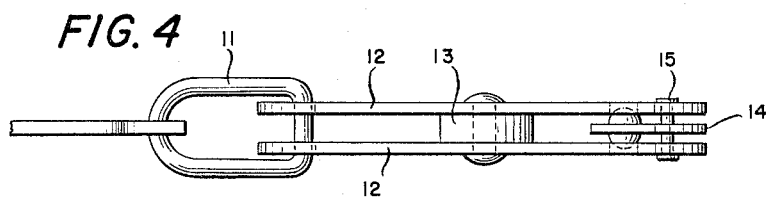

A hook member is provided at the end of flexible measuring member 8. As shown best in FIGURES 3 and 4, this hook member comprises a pair of substantially flat plates 12 joined together and spaced by any suitable washer or spacer 13. Pointed hook 14 is journaled for rotation between plates 12 in any convenient manner such as by shaft 15. A projection, such as ball 16, is provided on each side of hook 14 to cooperate with a depression or aperture such as socket 17 in each plate 12. The ball and socket arrangement provides a friction catch to releasably secure hook 14 at about 90° with respect to plates 12. The hook member is secured to the flexible measuring member in any convenient manner such as by link 11. The composite structure comprises a housing or casing 7 containing a coiled measuring member 8 terminating in a releasable hook member. The hook member is sized too large to be pulled into housing 7 by the action of spring 19. It can be seen that this structure is a common "tape measure" except for the hook member and, in fact, readily available tape measures may be modified for use in accordance with the present invention. Such modification involves the addition of the releasable hook member and means to mount the casing on the chain saw or other tool.

The present device is used in the following manner for cutting felled timber into logs of predetermined length: A chain saw is fitted with a measuring device having a hook member shown in FIGURES 3 and 4. Referring to FIG. 1, the operator approaches the right end of a log 18, secures the hook in its right angle position, and sets the hook at the end of the log. The operator then merely walks to the left until the indicator 9 is correlated with some fixed portion of the saw, such as the blade or frame. The distance between the hook and indicator has been pre-set to the proper length. The indicator may take any convenient form such as an eraseable mark, a metal clasp or the member 8 may be marked in units of length. The operator then pulls member 8 to release the hook and allows member 8 to coil under the influence of spring 19. By a proper selection of spring 19, excessive return speeds and "whiplash" can be avoided. After cutting the timber, the operator then sets the hook at 90° and secures it to the fresh face of the timber and proceeds to cut the whole timber into logs without help and without interruption.

It is clear that an analogous procedure can be performed but starting from the left of a timber and moving towards the right.

Further, a long timber may be cut into short lengths very conveniently as follows: Using a measuring member 8 marked in inches and feet, a twelve-foot timber could be cut into six two-foot logs by merely setting the hook at one end of a log, advancing the saw to the opposite end of the log, noting the indicated distance, moving two feet to the right, cutting the log, again moving two feet to the right, cutting the timber and so on until the timber is cut into six two-foot logs. The hook remains set during the procedure and member 8 is automatically coiled when the saw is moved. This procedure could also be performed starting from the left.

The measuring member 8 may be any convenient flexible material and the length indication may be achieved in any manner such as visual or acoustical. The member 8 may be "threaded" through convenient slots or guides such that the tape will lie adjacent the timber during the measuring step to increase accuracy and precision of measurement.

I claim:
1. A portable saw for performing work at a place on a piece of felled timber, said place being located at a predetermined distance from an end of said timber and comprising; a frame, a saw supported by the frame and positioned to cut through the timber, measuring means mounted on the said frame for measuring the said predetermined distance and comprising a flexible measuring member coilable within a housing secured to said frame, means for biasing said member into coil configuration with said housing and permitting said member to be extended from said housing, hook means secured to an end of said flexible member for engaging an end of the timber, releasable positioning means for determining the position of said hook means, said releasable positioning means comprising a frictional catch having at least a first position whereat the hook engages the end of the timber, and a second position whereat the hook is disengaged from said end of the timber, the catch being movable from the said first position to the said second position by the application of a force urging the flexible member towards the housing, and a measuring indicia on said flexible member to indicate the said predetermined distance between the saw and the end of the timber to which the hook means is secured.

2. A portable saw comprising a frame, a cutting means mounted on said frame for cutting through a length of felled timber at a selected place along said timber, length measuring means for measuring the distance from the end of the timber to said selected place and comprising a flexible measuring member coilable within a housing secured to said frame, hook means at an end of said flexible member for engaging the end of the timber and comprising a pair of opposed spaced plates, a hook member journaled therebetween and means for releasably holding said hook member at an angle of approximately 90° with respect to said plates to provide a hook to engage the end of a piece of timber, and measuring indicia on said flexible member to indicate the distance between the cutting means and the end of the timber to which said hook means is secured.

3. A portable saw according to claim 2 wherein said flexible member is nylon.

4. A length indicating device comprising a container, a flexible member having length indicating indicia thereon, a hook member secured to an end of said flexible member, frictional restraining means for releasably securing said hook member at an angle of approximately 90° with respect to said flexible member to engage the end of a work piece and hold the flexible member extended, and for allowing the hook to become disengaged from the work piece and extend parallel to the flexible member when a force is applied urging the flexible member towards the container, and a means to coil said flexible member in said container.

5. A length indicating device comprising a container, a flexible member having length indicating indicia thereon, a hook member secured to an end of said flexible member, said hook member comprising a pair of spaced plates secured to said flexible member and a hook member journaled to rotate between said plates, a restraining means for releasably securing said hook member at an angle of about 90° with respect to said flexible member, said restraining means comprising a ball and corresponding socket to secure said hook member at an angle of about 90° with respect to said plates and to permit said hook member to freely rotate upon the application of force to said hook member, and a means to coil said flexible member in said container.

References Cited by the Examiner

UNITED STATES PATENTS

| | | | |
|---|---|---|---|
| 841,272 | 1/1907 | Read | 33—137 |
| 2,023,408 | 12/1935 | Coll | 33—138 |
| 2,776,448 | 1/1957 | Trammell | 33—138 |
| 2,807,292 | 9/1959 | Gelinas | 143—32 |

DONALD R. SCHRAN, *Primary Examiner.*